INVENTOR.
NICK A. SCHUSTER
BY
Campbell, Brumbaugh, Free & Graves
HIS ATTORNEYS.

April 8, 1958

N. A. SCHUSTER 2,829,824

AUTOMATIC COMPUTER

Filed July 1, 1952

3 Sheets-Sheet 2

INVENTOR.
NICK A. SCHUSTER
BY
Campbell, Brumbaugh, Free & Graves
HIS ATTORNEYS.

April 8, 1958 N. A. SCHUSTER 2,829,824

AUTOMATIC COMPUTER

Filed July 1, 1952 3 Sheets-Sheet 3

INVENTOR.
NICK A. SCHUSTER
BY
Campbell, Brumbaugh, Free & Graves
HIS ATTORNEYS.

United States Patent Office 2,829,824
Patented Apr. 8, 1958

2,829,824

AUTOMATIC COMPUTER

Nick A. Schuster, Houston, Tex., assignor, by mesne assignments, to Schlumberger Well Surveying Corporation, Houston, Tex., a corporation of Texas Application July 1, 1952, Serial No. 296,649

22 Claims. (Cl. 235—61)

The present invention relates to automatic computers and more particularly to new and improved computer apparatus for continuously determining the value of a specified function of a plurality of independent variables in response to instantaneous values of the variables supplied thereto.

Computers have been devised heretofore in which a beam of radiant energy from a mechanical light scanning device or a cathode ray tube is positioned in different directions in response to values of two independent variables (i. e. $x$ and $y$, respectively), to control the point where the beam impinges upon a stationary screen laid out in a system of coordinates corresponding to the respective independent variables. The beam, after appropriate modification by the screen, is directed to a photosensitive device to produce a signal representative of the instantaneous value of a specified function $$u=f(x, y)$$

of the two variables. In one form of apparatus, the radiant energy transmission properties of the screen are made to vary at each point $(x_0, y_0)$ thereon according to the actual value of the function $u_0=f(x_0, y_0)$ at that point. In another form the screen carries indicia representing curves of the function for different values thereof, and the value of the function for any instantaneous value $x_0$ and $y_0$ of the independent variables is determined by counting the number of curves traversed by the beam in moving to the point $(x_0, y_0)$.

Computer apparatus of the types described briefly above have not been entirely satisfactory. For one thing, they are not suited for providing values of three or more independent variables. Further, where the apparatus must be housed within a relatively small space, the number of computable values is extremely limited because only a small size screen can be used. Also, where a cathode ray tube is employed as the beam source, it is difficult to maintain a fixed origin for the beam because of drift, and errors may result unless frequent corrections are made.

It is an object of the invention, accordingly, to provide new and improved computer apparatus of the general character described above which is free from the aforementioned deficiencies of the prior art.

Another object of the invention is to provide new and improved computer apparatus of the above character which enables an increased number of computable values to be accommodated in apparatus occupying a given space, whereby greater accuracy may be achieved.

These and other objects of the invention are attained by providing computer apparatus of the above general character in which a radiant energy beam is displaced in accordance with values of one independent variable so that its place of impingement upon the indicia bearing screen moves from a fixed origin along one coordinate axis to points representing said instantaneous values of that independent variable, the screen meanwhile being caused to sweep past the beam at a relatively rapid rate in the direction of another coordinate axis. Preferably, the screen has formed thereon indicia representing curves of a specified function $u=f(x, y)$ for different values of the function. The instantaneous value of the function is determined by taking the summation of the number of curve-representing indicia on the screen which traverse the beam in an interval of time representing the instantaneous value of a second independent variable, said time interval being measured from the instant when the position of impingement of the beam upon the screen occurs at a reference value of the second variable, usually zero.

In this construction, it will be apparent that the radiant energy beam is modulated as a function of the specified function, of the values of one of the independent variable, and of time. The modulated beam is then integrated with respect to time between limits set by another independent variable to produce a value representing the instantaneous value of the specified function for the instantaneous values of the independent variables.

By virtue of the fact that the screen is moved past the beam, the length of the coordinate axis in the direction of the screen motion can be made considerably greater than is possible with a stationary screen. Accordingly, the invention contemplates the provision of an expanded scale for that coordinate axis so that a greater number of curve-representing indicia can be accommodated on the screen, to the end that improved accuracy may be obtained in the computations.

Systems of either polar or rectangular coordinates may be utilized. In the former, the screen may be a rotating disc and the beam may be moved from the center along a radius in accordance with one independent variable. For rectangular coordinates, the screen may comprise an endless flexible belt member carrying the curve-representing indicia. In such case, the beam may be moved transversely of the belt in accordance with values of one variable while the belt is moved longitudinally at a uniform rate of speed. In either system, the screen may carry indicia representing a single family of curves, or it may be divided along the expanded scale axis into a plurality of sequential frames each carrying indicia representing a single family of curves.

Where it is desired to obtain values of a function of more than two variables i. e. $[u=f(x, y, z)]$, each frame on the screen carries indicia representing a family of curves corresponding to different values of the function and a fixed value of the variable $z$, the values of $z$ for successive frames being different. In this embodiment, means controlled in response to the instantaneous values of the variable $z$ renders the indicia counting mechanism operative only when the portion of the screen carrying the family of curves having the appropriate value of $z$ is in proper relation to the radiant energy beam.

The invention will be more fully understood with reference to the following detailed description taken in conjunction with the accompanying drawings, in which.

Figure 1:
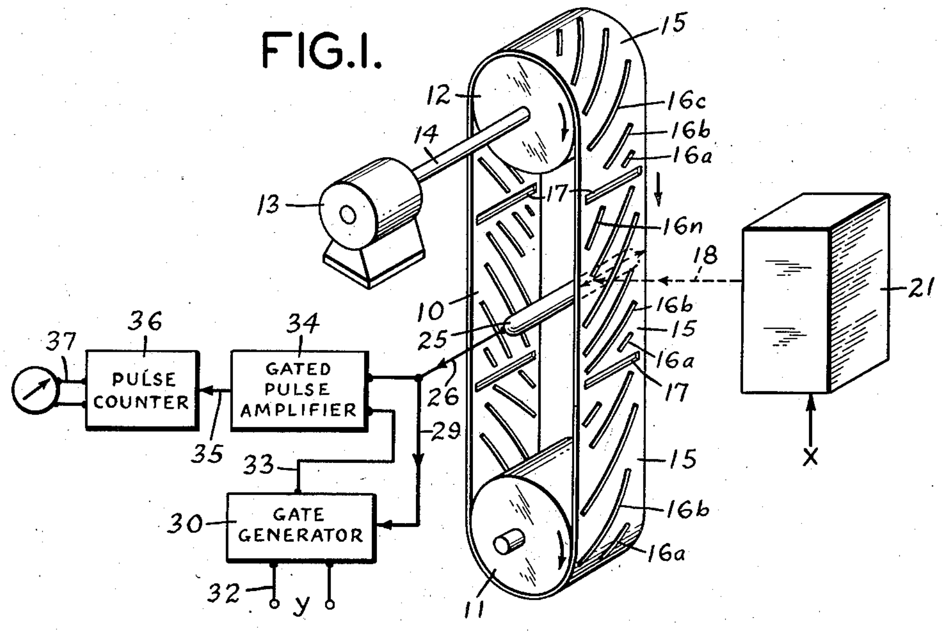
Fig. 1 is a schematic diagram of one form of the invention for computing values of a function of two independent variables.

In the interest of simplicity, the invention will be first described as embodied in apparatus for computing the value of a function of only two independent variables. In the typical embodiment shown in Fig. 1, the indicia-bearing screen member comprises an endless belt 10 adapted to be moved at a constant velocity by means of two rollers or pulleys 11 and 12, at least one of which is adapted to be driven by a motor 13 through suitable coupling means 14. The belt 10 is divided longitudinally into a plurality of segments or frames 15, each of which carries a plurality of curve-representing indicia **16*a* . . . 16*n*** which are positioned thereon with respect to angularly spaced apart coordinate axes intersecting in a common origin.

As a practical example, the indicia **16*a* . . . 16*n*** may represent a family of curves of a specified function $$u=f(x, y,)$$

for different values ( i. e. 0, 1, etc.,) of the function. In such case, the indicia **16*a* . . . 16*n* are positioned with reference to a rectangular coordinate system, the $x$ coordinate axis extending transversely of the belt 10 and the $y$ axis lying in the direction of movement of the belt 10. While the indicia 16*a* . . . 16*n* may be formed in any desired manner, preferably they comprise narrow slits formed in the belt 10, the latter being opaque. The $x$ coordinate axis ($y=0$) may be represented by a relatively broad slit 17 formed in the belt 10**.

While the extent of the $x$ axis is limited by the available width of the belt, it will be apparent that the $y$ axis may be expanded any convenient distance by employing a belt of appropriate length moving at a suitable speed. In this manner, the individual curves **16*a* . . . 16*n*** may be separated from each other in the $y$ direction by any convenient amount. Also, an expanded scale may be provided for the $y$ axis so that a greater number of curve-representing indicia may be provided per unit of $y$ so that the accuracy of computation may be increased.

A relatively intense, small diameter beam of light 18 is focused upon the belt 10, its point of impingement thereupon initially lying on the $y$ coordinate axis ($x=0$) as the belt 10 rotates. Optical systems for providing a beam of this character are well known and will not be described in detail herein. The beam of light 18 is adapted to be deflected transversely of the belt 10 from its initial position by an amount proportional to the amplitude of the independent variable $x$. Any conventional mirror galvanometer 21 may be used for this purpose provided that it has time constants that are fast compared to the expected variations in the variable $x$. The galvanometer system is preferably a compact, optically sealed unit, and should be of the type that is substantially unaffected by vibrations, particularly where it is intended for field use. The mirror galvanometer 21 is adapted to receive an electric signal proportional to the instantaneous value of the variable $x$ and to produce a corresponding deflection of the beam 18 transversely of the belt 10.

Disposed between the parallel sides of the belt 10 is an elongated photoelectric cell 25 which is positioned so as to be able to receive light from the beam 18 for all possible positions of the latter, to the extent permitted by the belt 10. Accordingly, as the belt 10 revolves, the modulation of the light beam 18 by the curve-representing indicia **16*a* . . . 16*n* and 17 will cause the photoelectric cell 25 to generate a corresponding series of electrical pulses. The number and/or time position of the pulses obtained during the passage of any one frame 15 between the beam 18 and the photocell 25 is a function of variable $x$ since the point of impingement of the beam 18 upon the frame 15 is also a function of $x$. Further, the number of pulses in any given period of time is a function of the speed of movement of the belt 10. Thus, the electrical output of the photocell 25** is a function of the instantaneous amplitude of the variable $x$, of time, and of the specified function $u=f(x, y)$.

The velocity of belt 10 should preferably be high enough to insure that no substantial change in the value of the variable $x$ takes place during the passage of a particular frame 15 between the light beam 18 and the photocell 25. Alternatively, conventional control means may be provided for deflecting the light beam 18 in proportion to the variable $x$ only during the interval between frames, the position of the beam remaining fixed while the curve-representing indicia **16*a* . . . 16*n* traverse the beam 18**.

Figure 2:
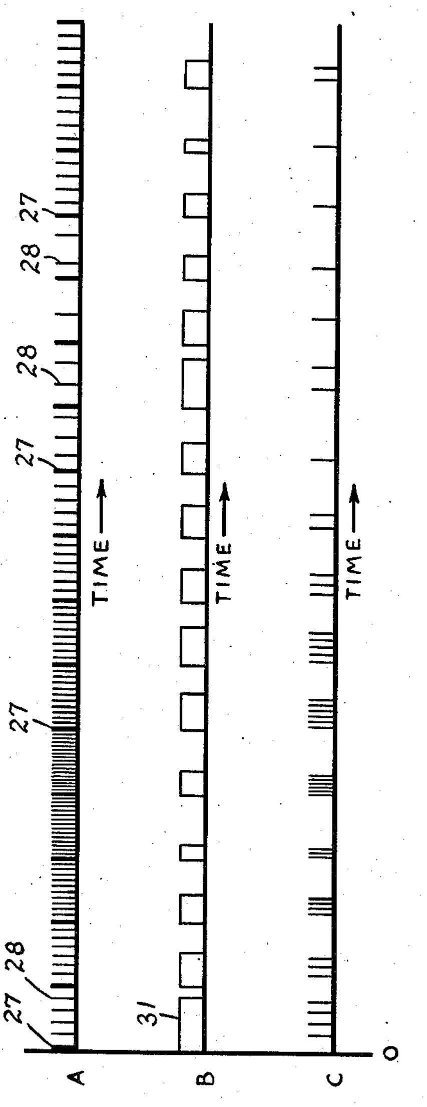
Fig. 2 is a graph of the time sequence of certain of the signals developed in the operation of the computer apparatus shown in Fig. 1.

In the graph A in Fig. 2, the electrical pulses appearing in the output of the photocell 25 are plotted as a function of time. As the broad reference slits 17 sweep past the beam 18, relatively wide synchronization pulses 27 are formed. Between adjacent synchronization pulses 27 appear a plurality of relatively narrow pulses 28 corresponding to the modulation of the beam 18 by the curve-representing indicia **16*a* . . . 16*n*. It will be appreciated that the number of pulses 28 and/or the positions of the pulses 28 relatively to the adjacent synchronization pulses 27 will be a function of the amplitude of variable $x$, determined by the particular function $u=f(x, y)$ represented by the indicia 16*a* . . . 16*n* on the frames 15. The time of occurrence of the pulses 28 will be a function of the speed of rotation of belt 10, and, for a constant speed, will be directly proportional to the spacing between the indicia 16*a* . . . 16*n*** along the $y$ coordinate through the instantaneous amplitude of the variable $x$.

In accordance with the invention, the pulses 28 are integrated between time intervals established by the instantaneous amplitude of the independent variable $y$ such that the result of the integration corresponds to the desired value of the function $u=f(x, y)$ for the instantaneous values of the variables $x$ and $y$ then obtaining. This may be accomplished by supplying the electrical output of the photocell 25 over a line 26 to a gated pulse amplifier 34 which transmits pulses over a line 35 to a conventional pulse counter 36 only while a gating signal of predetermined character is being supplied thereto. For the illustrative conditions shown in Fig. 1 in which the curve-representing indicia **16*a* . . . 16*n* representing the family of curves $u=f(x, y)$ are spaced apart along the $y$ axis parallel to the direction of movement of the belt 10, the speed of the latter being constant, the gating signal should be a pulse which starts simultaneously with a synchronizing pulse 27** and having a time duration proportional to the instantaneous value of the independent variable $y$.

The gating pulse may be produced by a gated generator 30 which may be for example a so-called "one-shot" multivibrator circuit. The operation of this circuit is such that for each input pulse supplied thereto, an output pulse is produced which has a time duration proportional to the magnitude of a control voltage. Thus, the gated generator 30 is adapted to receive the synchronizing pulses 27 (graph A of Fig. 2) from the photocell 25 over a line 29, suitable means (not shown) being provided for rejecting the pulses 28. It also receives over the line 32 a control voltage representing the instantaneous value of the independent variable $y$, and it is adapted to supply to the gated pulse amplifier 34, over the line 33, pulses 31 (graph B of Fig. 2) which start at the same time as the synchronizing pulses 27 and the widths or time durations of which are proportional to the instantaneous values of the variable $y$.

It will be understood that the time constants of the gated generator 30 must be carefully selected with regard to the speed of the belt 10. For example, if the velocity of the belt 10 is $m$ cm./sec. and the distance between adjacent slits 17 defining one frame 15 is $n$ cm., the widths of the pulses 31 should vary between substantially 0 second to substantially $n/m$ seconds as a function of the independent variable $y$.

In operation, the belt 10 is moved at a uniform rate of speed on the rollers 11 and 12, while voltages representing the instantaneous values of the independent variable $x$ and $y$, respectively, are supplied to the mirror galvanometer 21 and to the gate generator 30. As the slits 17 traverse the beam 18, synchronizing pulses 27 (graph A of Fig. 2) are produced in the output of the photocell 25. Further, as the curve-representing indicia 16a . . . 16n on each frame traverse the beam 18, the latter is modulated as a function of the independent variable $x$, of time, and of the specified function $u=f(x, y)$, producing correspondingly modulated pulses 28 (graph A of Fig. 2) in the output of the photocell 25.

The gate generator 30 responds jointly to synchronizing pulses 27 received over the lines 26 and 29 and to a control voltage representing instantaneous values of the independent variable $y$ received over the line 32 and produces gating pulses 31 (graph B of Fig. 2) which are fed over the line 33 to the gated pulse amplifier 34. The amplifier 34 permits the pulses 28 to pass over the line 35 to the pulse counter 36 only for the duration of the gating pulse 31. The number of pulses reaching the pulse counter 36 between the occurrence of adjacent synchronizing pulses 27, therefore, is proportional to the instantaneous value of the specified function $u=f(x, y)$ corresponding to the instantaneous values of the independent variables $x$ and $y$ during the passage of one frame 15 on the belt 10 between the beam 18 and the photocell 25.

A typical graph of the output of the pulse counter 36, which may be supplied to a conventional indicating instrument 37, is designated by the reference character C in Fig. 2 and it corresponds to the conditions obtaining for the graphs A and B in the same figure.

It will be appreciated that the synchronization of the gate generator 30 with the belt 10 may be effected in other ways than that shown in Fig. 1 for purposes of illustration. For example, the belt 10 may be uniformly partially transparent and the curve-representing indicia 16a . . . 16n and the reference indicia 17 may have different degrees of transparency relatively to each other and to the belt 10 so that the synchronizing pulses 27 may have a different amplitude or polarity than the pulses 28. Alternatively, the synchronizing pulses may be obtained from a conventional pulse generator directly or indirectly coupled to the driving motor 13.

Of course, the belt 10 may be provided with indicia 16a . . . 16n representing only a single family of curves of a specified function $u=f(x, y)$, the curve-representing indicia extending all the way around the belt 10. However, it is preferred to divide the belt 10 into a plurality of frames 15, each carrying curve-representing indicia 16a . . . 16n representing identical families of curves of a specified function, providing that the length of the belt and the separation desired between the indicia 16a . . . 16n will permit.

If desired, the apparatus shown in Fig. 1 may be utilized to obtain the instantaneous values of a plurality of different functions of the independent variables $x$ and $y$ corresponding to the instantaneous values of the variables then obtaining. This might be accomplished, for example, by providing in alternate frames 15 indicia representing curves corresponding to a given function $u=f(x, y)$, the intervening frames 15 varying indicia representing curves of another function $v=g(x, y)$. In order to determine the instantaneous values of the two functions separately, two pulse counters 36 with indicators 37 might be provided together with conventional electronic or other switching means, synchronized with the movement of the belt 10, for connecting the output of the amplifier 34 alternately to the two pulse counters 36 to render the latter responsive only to signals derived from the proper curve-representing indicia. On the other hand, if it is desired to obtain an indication of the function $u=f(x, y)+g(x, y)$, this may be gotten with the apparatus shown in Fig. 1 and the readings of the indicator 37 will be proportional to instantaneous values of the desired function.

Figure 3:
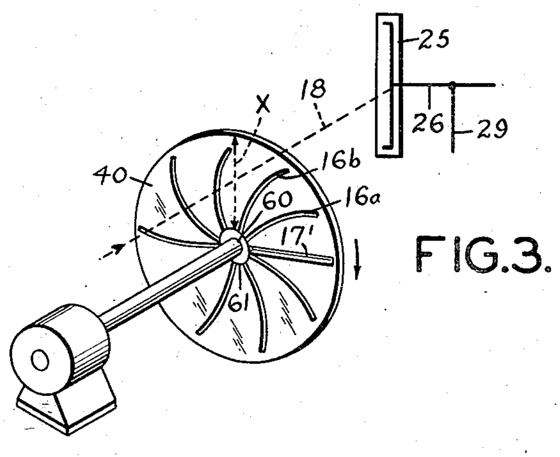
Fig. 3 illustrates a modification of a portion of the apparatus shown in Fig. 1.

While in Fig. 1, the curve-representing indicia 16a . . . 16n are positioned with reference to a system of rectangular coordinates on a rotating belt, it will be understood that they could be formed, for example, on a rotating drum. Alternatively, the curve-representing indicia corresponding to particular values of the function $u$ may be positioned with reference to a system of polar coordinates on a rotating disc 40 interposed between the beam 18 and the photocell 25, as shown in Fig. 3. In this embodiment, the light beam 18 may initially impinge upon the disc 40 at a point near the center 60 thereof, the locus of this point being a circle of small radius 61 and it may be moved radially towards the periphery of the disc 40 in proportion to the instantaneous value of the variable $x$. As in Fig. 1, the curve-representing indicia 16a . . . 16n may be slits in the disc 40 which may be opaque, and they may be angularly spaced apart about the center of the disc 40 as shown. A radial reference slot 17' may be provided to produce a synchronizing pulse in the output of the photocell. Otherwise, the system is the same as in Fig. 1 and it operates in essentially the same way.

If desired, logarithmic scales may be provided for either or both of the $x$ and $y$ coordinate axes. Where the $y$ axis has a logarithmic scale, the spacing between the curve-representing indicia 16a . . . 16n can be made even greater in a region of interest than is possible with a linear scale for the $y$ axis on the belt 10. In such case, the pulse generator 30 should be designed to provide gating pulses whose time duration varies logarithmically with the control voltage representing the instantaneous value of the variable $y$. If the $x$ axis is provided with a logarithmic scale, suitable means should be provided for causing the deflection of the beam 18 to vary logarithmically with the voltage representing the instantaneous value of the variable $x$. For example, a logarithmic amplifier (not shown) might be interposed between the mirror galvanometer 21 and the source of the voltage representing the variable $x$, or a galvanometer having a logarithmic relation between input and beam deflection might be employed. Obviously, other forms of nonlinear scales may be employed, as desired.

The accuracy obtainable with computers constructed in accordance with the invention depends upon the number of curve-representing indicia 16a . . . 16n per scale unit along the $y$ axis. As mentioned above, a high degree of accuracy is possible by expansion of the scale of one of the coordinates, in particular the $y$ coordinate in the embodiments shown herein. By the use of indicia representing a plurality of different families of curves, the values of function of more than two independent variables may be determined with an accuracy dependent on the number of separate families employed.

Figure 4:
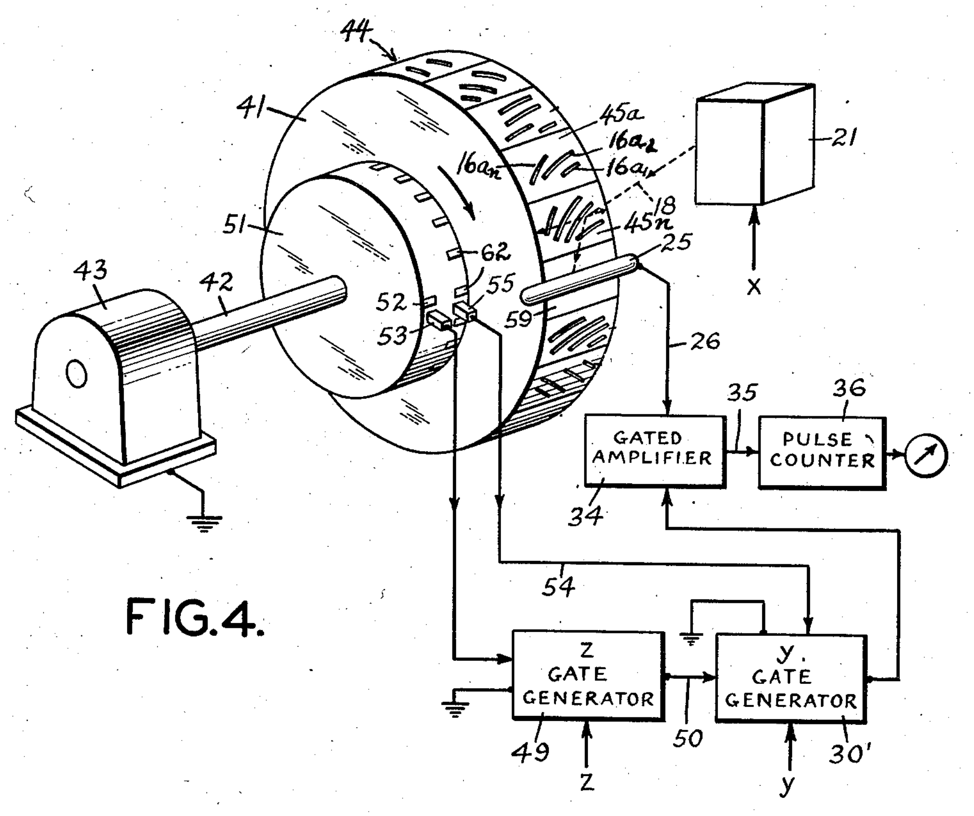
Fig. 4 is a schematic showing of another embodiment of the invention for computing the instantaneous value of a function of three independent variables.

In Fig. 4 there is shown a typical embodiment of the invention for obtaining continuously the value of a specified function $u=f(x, y, z)$ where $x$, $y$ and $z$ are independent variables. In a number of respects, the apparatus is similar to that shown in Fig. 1 and like parts have been designated by like reference characters.

Referring now to Fig. 4, the indicia bearing member may comprise a cylindrical drum 41 adapted to be rotated by a shaft 42 coupled to a constant speed motor 43. The annular surface 44 of the drum 41 is divided into a plurality of similar segments or frames 45a . . . 45n on each of which are formed a plurality of indicia-representing curves of the function $u=f(x, y, z)$ for different values of the function and for given values of the variable $z$. Thus, the frame 45a may carry a plurality of indicia 16$a_1$ . . . 16$a_n$ representing curves of the function $u=f(x, y, z)$ for $z=z_1$ and for different values i. e., 0, 1 etc.,) of the function. Similarly, the frames 45b, 45c . . . 45n, may be provided with like indicia representing curves of the function for different values thereof and for $z=z_2$, $z_3$ . . . $z_n$, respectively. The indicia may comprise, for example, reflecting lines formed on a non-reflecting background and they may be positioned with reference to a rectangular coordinate system, the $x$ axis lying parallel to the axis of rotation of the drum 41 and the $y$ axis being perpendicular thereto.

The mirror galvanometer 21 receives a voltage proportional to the instantaneous amplitude of the variable $x$ and produces a corresponding deflection of the beam 18 transversely of the annular surface 44 of the drum 41 as the latter rotates. Light reflected from the drum surface 44 tends to impinge on the photocell 25 which is appropriately situated to accomplish this end.

In accordance with the invention, the electro-optical computer shown in Fig. 4 is adapted to be activated only during the period when the light beam 18 impinges upon the frame carrying the indicia representing the family of curves of the specified function for the instantaneous value of $z$. To this end, a voltage representing the instantaneous value of the variable $z$ may be fed into a gate generator 49 which may be of the same type as the generator 30 of Fig. 1. The gate generator 49 may be activated in synchronism with the rotation of the drum 41 by any suitable means, as, for example, by a synchronizing pulse generated in a series circuit including a source of electrical energy (not shown), an electrical contact 52 on a drum 51 driven in synchronism with the drum 41, which is adapted to engage periodically a fixed contact 53. Whenever the contact 53 engages the contact 52, a synchronizing pulse is supplied to the input of generator 49, this pulse being synchronized with the beginning of a particular series of frames 45 on the drum 41.

Figure 5:
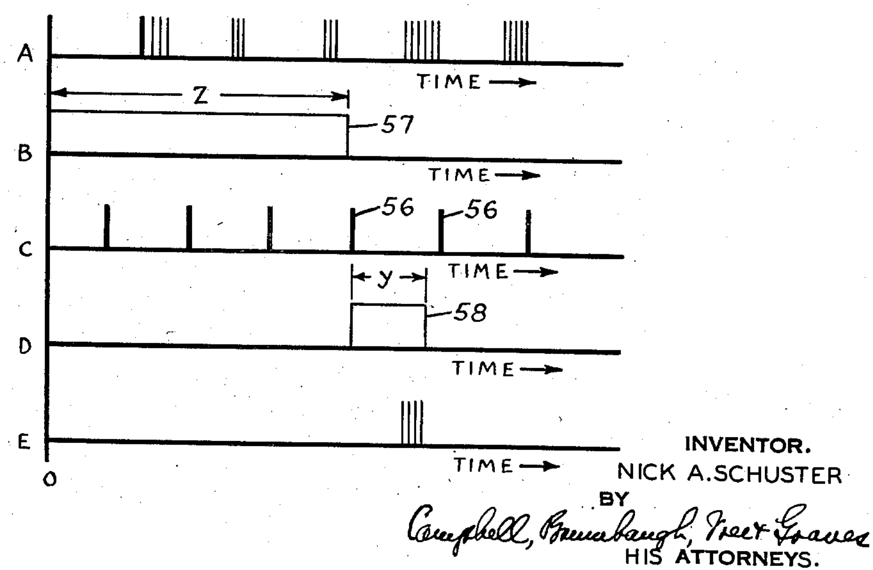
Fig. 5 is a graph of the time sequence of certain of the signals generated in the operation of the computer apparatus shown in Fig. 4.

The gating pulse in the output of the gate generator 49 has a time duration proportional to the instantaneous amplitude of variable $z$, as shown in the graph B of Fig. 5. This output is fed over a line 50 to an input of a second gate generator 30′ which may be like the gate generator in Fig. 1. The gate generator 30′ also receives a plurality of synchronizing pulses 56 (graph C in Fig. 5) corresponding to the beginning of each of the frames $45a$ . . . $45n$ passing the photocell 25. These pulses may be generated by means of a circuit including a conductor 54, a brush 55 on the auxiliary drum 51 which is adapted to engage successively a plurality of contacts 62 and a source of electrical energy (not shown). However, the gate generator 30′ is designed so that it can be activated by the synchronizing pulses 56 only upon completion of a synchronization pulse 57 (graph B of Fig. 5). Thus, the first synchronizing pulse 56 following the termination of synchronizing pulse 57 initiates a gating pulse 58 (graph D in Fig. 5) in the gate generator 30′, the duration of which is determined by the instantaneous amplitude of variable $y$. The circuit shown in Fig. 4 is adapted to generate only one pulse 58 during each revolution of the drum 41.

In the graph A of Fig. 5, the continuous pulse output of the photocell 25 is plotted as a function of time. The gating pulse 58 (graph B in Fig. 5) selects the particular frame $45a$ . . . $45n$ corresponding to the instantaneous amplitude of the variable $z$. The gate generator 30′ then generates a gating pulse 58 (graph D in Fig. 5) which renders the gated amplifier 34 effective to pass to the pulse counter 36 the pulses in the output of the photocell 25 produced by the beam 18, modulated as a function of the curve-representing indicia. Accordingly, the number of pulses passed to the counter 36 (graph E) and indicated by the indicator 37 corresponds to the instantaneous value of the function $u=f(x, y, z)$.

It will be understood that the means for producing the several synchronizing pulses in Fig. 4 are exemplary only and synchronization pulses may be obtained in any other convenient manner. For example, suitable pulses might be derived from additional indicia formed on the surface 44 of the drum 41, analogous to the slots 17 in the belt 10 of Fig. 1. In order to facilitate the proper selection of the indicia representing the first family of curves $16a_1$ . . . $16a_n$ by the synchronizing pulse 57 (graph B of Fig. 5) in the preferred embodiment of the invention one of the frames $45a$ . . . $45n$ may be left blank. It will also be understood that the variable $z$ may be employed to determine the instant that the signal representing the variable $x$ should become operative, rather than the signal representing the variable $y$, as in Fig. 4. In such case, the beam 18 might normally be extinguished and the variable $z$ might be used to turn it on when the indicia representing the proper family of curves are in the proper position relative thereto.

While functions of two or three independent variables may be computed with the apparatus shown in Figs. 1 and 4, it will be understood that values corresponding to functions of more than three variables may be computed, if desired. For example, if four variables are to be employed, additional sets of rotating drums 41 may be employed, each corresponding to a predetermined value of the fourth variable. The fourth variable may then be used to select the proper gate amplifier 34 to pass pulses to the pulse counter 37.

From the foregoing, it will be apparent that the invention provides novel and highly effective computer apparatus for determining the instantaneous value of a specified function of two or more independent variables. By virtue of the construction described, one of the coordinate axes with respect to which the curve-representing indicia are positioned may be expanded considerably, thereby enabling the spacing between adjacent indicia to be increased and more indicia to be provided per scale unit of the expanded axis, so that greater accuracy may be achieved.

The specific embodiments described above are intended to be merely illustrative and are obviously susceptible of modification in form and detail within the scope of the invention. Thus, the curve-representing indicia may be of any desired form capable of modulating a beam of radiant energy. Further, the belt may be made of a material capable of reaining momentarily an image of an object and selected images of indicia may be projected thereon instantaneously to represent the desired curves. Other modifications will be readily apparent to those skilled in the art. The invention, therefore, is not to be limited to the representative embodiments disclosed but is to be viewed as broadly as the following claims will allow.

I claim:

1. In computer apparatus, the combination of a member carrying a plurality of indicia, means forming a radiant energy beam adapted to impinge upon said member, means for deflecting said beam in one direction, means for moving said member in another direction to modulate said beam as a function of said indicia, and means operated in response to movement of said member and in synchronism with said member for establishing a time interval for utilization of said modulated beam.

2. In computer apparatus, the combination of a member carrying a plurality of indicia, means forming a radiant energy beam adapted to impinge upon said member, means for deflecting said beam in one direction, means for moving said member in another direction to modulate said beam as a function of said indicia, means for utilizing said modulated beam during a selected time interval, and means operated in response to movement of said member and in synchronism with said member for controlling said utilizing means to establish said time interval.

3. In computer apparatus, the combination of a member carrying a plurality of indicia, means forming a radiant energy beam adapted to impinge upon said member, means for deflecting said beam in one direction as a function of instantaneous values of a variable, means for moving said member in another direction to modulate said beam as a function of said indicia, of said variable, and of time, means for utilizing said modulated beam during a selected time interval, and means synchronized with said member and responsive to the instantaneous value of another variable for controlling said utilizing means to establish said time interval.

4. In computer apparatus, the combination of a screen member having first curve-representing indicia and second reference indicia formed thereon, a radiant energy beam adapted to impinge upon said member, means for deflecting said beam in one direction as a function of instantaneous values of one variable, means for moving said member in another direction to modulate said beam as a function of said indicia, of said variable, and of time, photoelectric means disposed to receive said modulated beam for producing first and second electric signals corresponding to said first and second indicia, respectively, means for utilizing said first signals during a time interval, and means jointly responsive to said second signals and to the instantaneous value of a second variable for controlling said utilizing means to establish the duration of said time interval.

5. In computer apparatus, the combination of an endless belt carrying first curve-representing indicia and second reference indicia thereon, a radiant energy beam adapted to impinge upon said belt, means for deflecting said beam transversely of said belt as a function of the instantaneous value of one variable, means for moving said belt at a desired speed to modulate said beam as a function of said indicia, of said variable, and of time, photoelectric means disposed to receive said modulated beam for producing first and second electric signals corresponding to said first and second indicia, respectively, amplifier means connected to receive signals from said photoelectric means and normally in one condition of operation, and electronic means jointly responsive to said second signals and to the instantaneous value of a second variable for changing the condition of operation of said amplifier means.

6. In computer apparatus for determining the value of a function of two independent variables, the combination of a screen member having indicia thereon representing curves of a function for different values thereof, said indicia being positioned with reference to angularly disposed corrdinate axes, a radiant energy beam disposed to impinge upon said screen and to be deflected relatively thereto in the direction of one of said coordinate axes as a function of one of said variables, means for moving said screen relatively to said beam in the direction of the other of said coordinate axes to modulate said beam as a function of said indicia, means responsive to said modulated beam, and means operated in synchronism with said member and responsive to the instantaneous value of the other variable for controlling said last-named means.

7. In computer apparatus for determining the value of a function of two independent variables, the combination of a screen member having indicia thereon representing curves of a function for different values thereof, said indicia being positioned with reference to angularly disposed coordinate axes, a radiant energy beam disposed to impinge upon said screen and to be deflected relatively thereto in the direction of one of said coordinate axes as a function of one of said variables, means for moving said screen relatively to said beam in the direction of the other of said coordinate axes to modulate said beam as a function of said indicia, means for converting said modulated beam to an electric signal, and means operated in synchronism with said member and responsive to the instantaneous value of the other of said independent variables for establishing the duration of said electric signal.

8. In computer apparatus for determining the value of a function of two independent variables, the combination of a screen member having first indicia representing curves of said function for different values thereof and second reference indicia, said indicia being positioned with reference to angularly disposed coordinate axes, a radiant energy beam disposed to impinge upon said screen, means for deflecting said beam in the direction of one of said coordinate axes as a function of one of said variables, means for moving said screen relatively to said beam in the direction of the other of said coordinate axes to modulate said beam as a function of said indicia, of said variable and of time, photoelectric means disposed to receive said modulated beam for producing first and second electric signals corresponding to said first and second indicia, respectively, normally inoperative electrical amplifier means connected to receive the output of said photoelectric means, and electronic means jointly responsive to said second signals and to the instantaneous value of the other of said independent variables for rendering said amplifier means operative to pass the output of said photoelectric means.

9. In computer apparatus, the combination of an endless belt having reference indicia thereon dividing it into a plurality of like frames, means forming a plurality of curve-representing indicia on each of a plurality of frames, means forming a radiant energy beam adapted to impinge upon said belt, means for deflecting said beam transversely of the belt as a function of the instantaneous value of a variable, means for moving said belt relatively to said beam to modulate the latter as a function of said reference and curve-representing indicia, of said variable, and of time, photoelectric means disposed to receive said modulated beam for producing first and second electric signals corresponding to said reference and curve-representing indicia, respectively, normally inoperative electrical amplifier means connected to receive output signals from said photoelectric means, and electronic means jointly responsive to said first signals and to the instantaneous value of another variable for rendering said amplifier means operative to pass the second signals in the output of said photoelectric means.

10. In computer apparatus, the combination of an endless belt having reference indicia thereon dividing it into a plurality of like frames, means forming a plurality of first curve-representing indicia on alternate of said frames, means forming a plurality of second curve-representing indicia on intervening frames, means forming a radiant energy beam adapted to impinge upon said belt, means for deflecting said beam transversely of the belt as a function of a variable, means for moving said belt longitudinally thereof to modulate said beam as a function of said first and second curve-representing indicia and reference indicia, of said variable, and of time, photoelectric means disposed to receive said modulated beam for producing first and second electric signals corresponding to said reference and curve-representing indicia, respectively, normally inoperative electrical amplifier means connected to receive output signals from said photoelectric means, and electronic means jointly responsive to said first signals and to the instantaneous value of another variable for rendering said amplifier means operative to pass second signals from said photoelectric means.

11. Computer apparatus as defined in claim 10 together with a plurality of electrical counter means, and switching means operated in synchronism with said belt for connecting the output of said amplifier means selectively to said counter means.

12. In computer apparatus, the combination of a rotatably mounted disc-like member carrying angularly spaced apart indicia thereon, means forming a radiant energy beam adapted to impinge upon said member, means for deflecting said beam radially of said member as a function of the instantaneous value of a variable, means for rotating said disc-like member to modulate said beam as a function of said indicia, of said variable, and of time, means for utilizing said beam during a selected time interval, and means operated in synchronism with said member and responsive to the instantaneous value of another variable for controlling said utilizing means to establish said time interval.

13. In computer apparatus, the combination of a member having indicia formed on a portion thereof, means forming a radiant energy beam adapted to impinge upon said member, means for moving said member to modulate said beam as a function of said indicia, of time and of the position of said beam, means rendered inoperative while said indicia are traversing said beam for deflecting said beam at an angle to the direction of movement of said member as a function of the instantaneous value of a variable, means for utilizing said modulated beam during a selected time interval, and means operated in synchronism with said beam and responsive to the instantaneous value of a variable for controlling said utilizing means to establish said time interval.

14. In computer apparatus, the combination of a member divided into a plurality of adjacent frames extending in one direction, means forming a plurality of indicia on each of said frames, means forming a radiant energy beam adapted to impinge upon said member, means for deflecting said beam in one direction relatively to said member as a function of one variable, means for moving said member in another direction relatively to said beam to modulate said beam as a function of said indicia, of said variable, and of time, means for utilizing said modulated beam during a selected time interval, means operated in synchronism with said member and responsive to the instantaneous value of a second variable for initiating said time interval, and means operated in synchronism with said member and responsive to the instantaneous value of a third variable for establishing the duration of said time interval.

15. In computer apparatus, the combination of a member divided into a plurality of adjacent frames extending in one direction, means forming a plurality of indicia on each of said frames, means forming a radiant energy beam adapted to impinge upon said member, means for deflecting said beam in one direction relatively to said member as a function of the instantaneous value of one variable, means for moving said member in another direction relatively to said beam to modulate said beam as a function of said indicia, of said variable, and of time, means for utilizing said modulated beam during a selected time interval, means operated in synchronism with said member for producing a first signal each time a predetermined relation between said member and said beam obtains, means operated in synchronism with said member for producing a second signal each time each of said frames comes into a predetermined relation to said beam, means responsive jointly to said first signal and to the instantaneous value of a second variable for generating a pulse to determine the beginning of said time interval, and means jointly responsive to one of said second signals and to said pulse for controlling said utilizing means to establish said time interval.

16. In computer apparatus, a member adapted to be moved at a desired speed, said member carrying indicia representing curves of a function for various values thereof and positioned with reference to angularly disposed coordinate axes, one of said axes being in the direction of movement of the member and the other of said axes running transversely to the direction of movement of the member.

17. In computer apparatus, an endless belt adapted to be moved at a desired speed, said belt carrying first curve-representing indicia and second reference indicia, said first indicia formed from curves of a function for various values thereof and positioned with reference to angularly disposed coordinate axes, one of said axes being in the direction of the belt and the other of said axes running transversely to the belt, said second indicia adapted to be employed to provide a time reference when the belt is moved at the desired speed.

18. In computer apparatus, an endless belt adapted to be moved at a desired speed, said belt carrying reference indicia thereon dividing it into a plurality of like frames, means forming indicia on each of said frames, said last-mentioned indicia representing curves of a function for various values thereof and positioned with reference to angularly disposed coordinate axes, one of said axes being in the direction of the belt and the other of said axes running transversely to the belt.

19. In computer apparatus, an endless belt adapted to be moved at a desired speed, said belt carrying reference indicia thereon deviding it into a plurality of like frames, means forming like first curve-representing indicia on the alternate frames, means forming like second curve-representing indicia on the intervening frames, said curve-representing indicia formed from curves of functions for various values thereof and positioned with reference to angularly disposed coordinate axes, one of said axes being in the direction of the belt and the other of said axes running transversely to the belt.

20. In computer apparatus, a disc adapted to be rotated at a desired speed, first curve-representing indicia and second reference indicia formed thereon, said first indicia formed from curves of a function for various values thereof, each curve positioned with reference to a radius of the disc and angular displacement from said radius.

21. In computer apparatus, drum means adapted to be rotated at a desired speed, a surface of said drum means divided into a plurality of adjacent frames, means forming indicia on each of said frames, said indicia representing curves of a function for various values thereof and positioned with reference to angularly disposed coordinate axes, one of said axes being in the direction of the rotation of the drum and the other of said axes running transversely to said surface.

22. In computer apparatus, a first drum adapted to be rotated at a desired speed having the outer surface thereof divided into a plurality of adjacent frames, means forming indicia on each of said frames, said indicia representing curves of a function for various values thereof and positioned with reference to angularly disposed axes, one of said axes being in the direction of the rotation of the drum and the other of said axes running transversely to said outer surface, and a second drum coupled to said first drum, said second drum carrying indicia on the surface thereof.

References Cited in the file of this patent

UNITED STATES PATENTS

| | | |
|---|---|---|
| 2,088,297 | Koenig | July 27, 1937 |
| 2,398,238 | McNatt | Apr. 9, 1946 |
| 2,412,467 | Morton | Dec. 10, 1946 |
| 2,420,013 | Rajchman | May 6, 1947 |
| 2,431,591 | Snyder | Nov. 25, 1947 |